(12) United States Patent
Yasuda et al.

(10) Patent No.: US 10,139,002 B1
(45) Date of Patent: Nov. 27, 2018

(54) GASKET EQUIPPED WITH BEAD WITH DIFFERENT HARDNESS

(71) Applicant: ISHIKAWA GASKET CO., LTD., Tokyo (JP)

(72) Inventors: Kisho Yasuda, Tokyo (JP); Takanobu Yokoyama, Utsunomiya (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 28 days.

(21) Appl. No.: 15/630,487

(22) Filed: Jun. 22, 2017

Related U.S. Application Data

(62) Division of application No. 14/712,477, filed on May 14, 2015.

(30) Foreign Application Priority Data

Nov. 13, 2014 (JP) ................................ 2014-230619

(51) Int. Cl.
| | | |
|---|---|---|
| *F16J 15/08* | (2006.01) | |
| *F02F 11/00* | (2006.01) | |
| *F16J 15/00* | (2006.01) | |
| *F16J 15/10* | (2006.01) | |

(52) U.S. Cl.
CPC ......... *F16J 15/0806* (2013.01); *F16J 15/002* (2013.01); *F16J 15/0818* (2013.01); *F16J 15/0825* (2013.01); *F16J 15/102* (2013.01); *F02F 11/002* (2013.01); *F16J 2015/0837* (2013.01); *F16J 2015/0856* (2013.01); *F16J 2015/0868* (2013.01)

(58) Field of Classification Search
CPC .. F16J 15/0806; F16J 15/0818; F16J 15/0825; F16J 2015/0837; F16J 2015/0843; F16J 2015/085; F16J 2015/0862; F16J 2015/0868; F02F 11/002
See application file for complete search history.

(56) References Cited

U.S. PATENT DOCUMENTS

| | | | | |
|---|---|---|---|---|
| 5,582,415 | A * | 12/1996 | Yoshida | F16J 15/0825 277/592 |
| 5,584,490 | A * | 12/1996 | Inoue | F16J 15/0825 277/595 |
| 5,906,376 | A * | 5/1999 | Udagawa | F16J 15/0818 277/593 |
| 6,257,591 | B1 * | 7/2001 | Abe | F16J 15/0806 277/591 |

(Continued)

*Primary Examiner* — Nicholas L Foster
(74) *Attorney, Agent, or Firm* — Manabu Kanesaka

(57) ABSTRACT

A gasket includes at least one metal plate formed of a martensitic stainless steel plate and clamped between two members fastened by fastening devices, a cylinder bore provided in the metal member, a seal bead protruding outwardly from a flat surface of the metal plate, and annularly surrounding the cylinder bore, the seal bead having a top portion and two side portions arranged at two sides of the top portion, and insertion holes for the fastening devices to pass through, provided around the cylinder bore. The seal bead has a high hardness portion having a hardness higher than that in a portion of the metal plate other than the high hardness portion. The high hardness portion has a thickness gradually reduced toward a boundary between the high hardness portion and the portion other than the high hardness portion.

5 Claims, 5 Drawing Sheets

(56) References Cited

U.S. PATENT DOCUMENTS

| | | | | |
|---|---|---|---|---|
| 6,779,800 B2* | 8/2004 | Udagawa | ............ | F16J 15/0818 |
| | | | | 277/592 |
| 7,059,609 B1* | 6/2006 | Locke | ................. | F16J 15/0825 |
| | | | | 277/593 |
| 7,204,491 B2* | 4/2007 | Hatamura | ............ | F16J 15/0818 |
| | | | | 277/593 |
| 8,960,681 B2* | 2/2015 | Takeda | ................. | F16J 15/0825 |
| | | | | 277/598 |
| 2003/0015844 A1* | 1/2003 | Udagawa | ............ | F16J 15/0818 |
| | | | | 277/594 |
| 2004/0195781 A1* | 10/2004 | Saito | ........................ | B05D 7/14 |
| | | | | 277/592 |
| 2011/0095492 A1* | 4/2011 | Takeda | ................. | F16J 15/0825 |
| | | | | 277/598 |

\* cited by examiner

GASKET EQUIPPED WITH BEAD WITH DIFFERENT HARDNESS

CROSS-REFERENCE TO RELATED APPLICATION

This is a divisional application of Ser. No. 14/712,477 filed on May 14, 2015, which claims priority of Japanese Patent Application No. 2014-230619 filed on Nov. 13, 2014.

BACKGROUND OF THE INVENTION AND RELATED ART STATEMENT

The present invention relates to a gasket, and more specifically, relates to the gasket which can improve a seal performance without causing an insufficient fastening force even in a case wherein a fastening force by a fastening device is low.

There is proposed a gasket wherein a hardness lowering area where the hardness is locally reduced is provided only at one portion of a seal bead annularly formed in a ferritic stainless steel plate (for example, see Japanese Patent Application Publication No. 2000-027999).

The gasket retains high hardness portions except for the hardness lowering area to obtain a spring characteristic, and an elongation in the hardness lowering area of the seal bead so as to prevent an edge portion of the seal bead from cracking. Incidentally, a metal plate forming the gasket is an austenitic stainless steel plate represented by SUS301-CSPH and SUS304-CSPH or the ferritic stainless steel plate represented by SUS430 specified in JIS (Japanese Industrial Standards), and the hardness thereof is set at a Vickers hardness value of 400HV to 550HV. Also, the hardness of the hardness lowering area is set at the Vickers hardness value of 170HV to 445HV.

Recently, in order to improve fuel consumption of an engine, thicknesses of a cylinder head and a cylinder block are reduced to attain weight reduction and low rigidity. Consequently, with the reduction of the thicknesses of the cylinder head and the cylinder block, a bolt fastening force of the gasket is reduced.

Thus, in a case wherein the bolt fastening force is reduced, in the gasket described in Japanese Patent Application Publication No. 2000-027999, even a portion where the reinforcement of the seal performance is unnecessary becomes the high hardness as well, so that when the cylinder head and the cylinder block are fastened, the gasket causes the insufficient fastening force so as to deteriorate the seal performance.

The present invention is made in view of the aforementioned problem, and an object of the present invention is to provide a gasket and a method for manufacturing a gasket which can improve the seal performance without causing the insufficient fastening force even in the case wherein the fastening force by the fastening devices is low.

Further objects and advantages of the invention will be apparent from the following description of the invention.

SUMMARY OF THE INVENTION

In order to solve the aforementioned problem, a gasket of the present invention is formed by one sheet of metal plate or two or more sheets of laminated metal plates, clamped between two members fastened by a fastening device, and comprises an opening portion corresponding to a sealing hole provided in at least one of the two members; a seal bead protruding toward one of the two members from a flat surface of the metal plate, and annularly surrounding the opening portion; and an insertion hole wherein the fastening device is inserted to pass therethrough. At least one sheet of the metal plates is formed by a martensitic stainless steel plate, and a high hardness portion having hardness higher than that of the stainless steel plate is formed in the at least one portion of the seal bead formed in the stainless steel plate.

Also, in order to solve the aforementioned problem, a method for manufacturing a gasket of the present invention to be clamped between two members fastened by the fastening devices, comprises a process of forming an opening portion corresponding to a sealing hole provided in at least one of two members, a seal bead protruding toward the one of the two members from a flat surface of a stainless steel plate and annularly surrounding the opening portion, and an insertion hole wherein a fastening device is inserted to pass therethrough, in the one sheet of metal plate, or at least one sheet of martensitic stainless steel plate among two or more sheets of laminated metal plates. After that, the method for manufacturing the gasket carries out a process of forming the high hardness portion having the hardness higher than that of the stainless steel plate by applying hardening processing wherein laser is irradiated to at least one portion of the seal bead.

According to the gasket and the method for manufacturing the gasket of the present invention, at least one sheet of metal plate forming the gasket is formed by a martensitic stainless steel plate, and the high hardness portion having the hardness higher than that of the surroundings is formed at one portion of the seal bead formed in the stainless steel plate thereof. Thereby, the hardness of the whole gasket can be reduced, so that even in a case wherein a fastening force by the fastening device is low, an insufficient fastening force can be prevented, and the hardness at a portion where a seal performance is necessary is increased by the high hardness portion so as to improve the seal performance.

For example, when the gasket is fastened by the fastening device, the high hardness portion is formed at a portion which becomes a low surface pressure of the seal bead so as to reinforce the portion thereof, or the hardness rising or falling portions are provided in a circumferential direction of the seal bead so as to equalize the seal performance.

BRIEF DESCRIPTION OF THE DRAWINGS

FIGS. 3(a) and 3(b) are enlarged views showing a high hardness portion in FIG. 1 as an example, wherein FIG. 3(a) is a plan view of the high hardness portion, and FIG. 3(b) is a horizontal cross-sectional view taken along a line III-III in FIG. 3(a);

FIGS. 8(a) and 8(b) are drawings showing another embodiment of the gasket as an example according to the present invention, wherein FIG. 8(a) is a plan view of the gasket, and FIG. 8(*b*) is a horizontal cross-sectional view taken along a line VIII-VIII in FIG. 8(*a*).

DETAILED DESCRIPTION OF PREFERRED EMBODIMENTS

Figure 1:
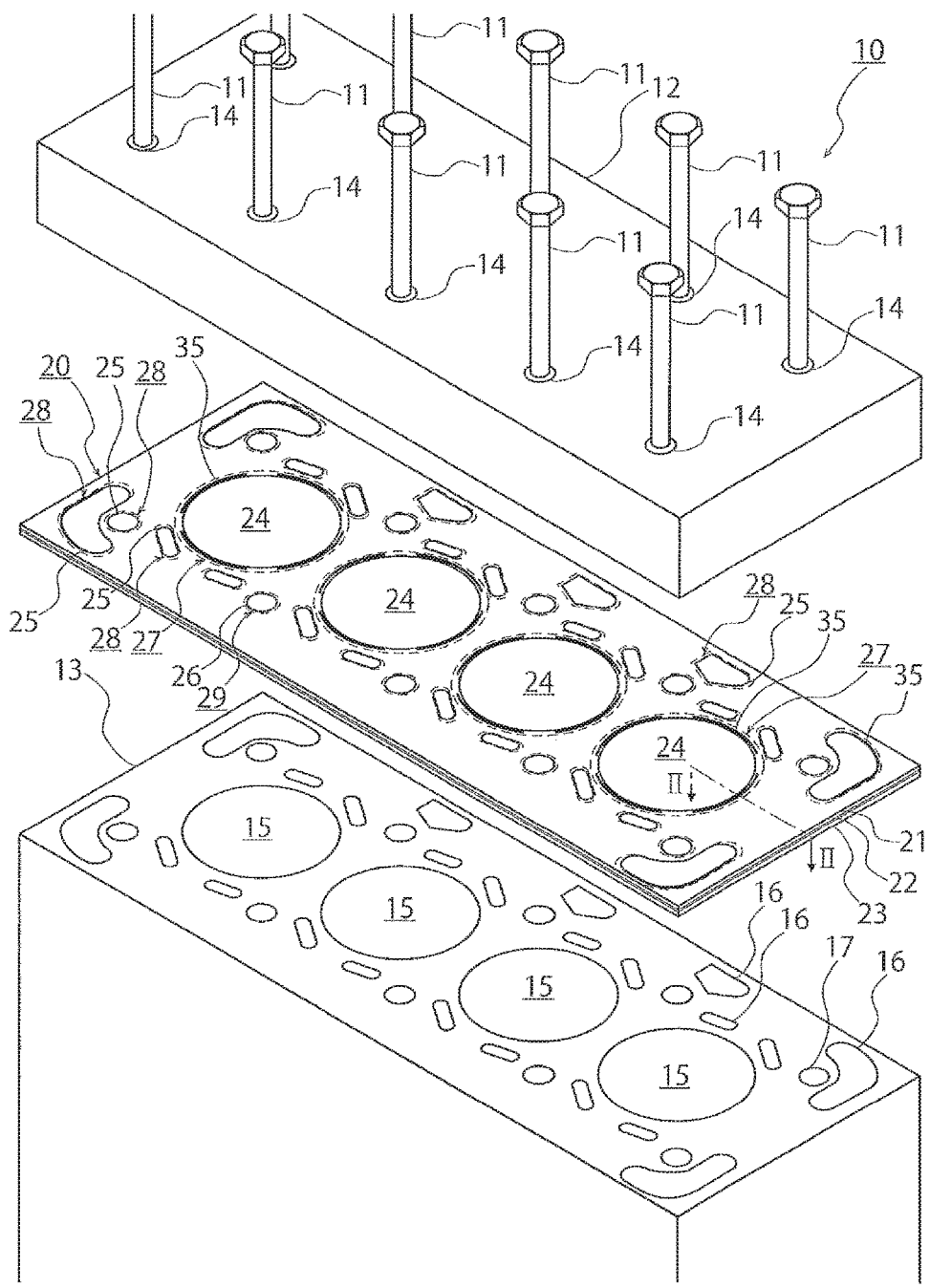
FIG. 1 is a perspective view showing an embodiment of a gasket as an example according to the present invention.

Hereinafter, embodiments of a gasket and a method for manufacturing a gasket according to the present invention will be explained. Incidentally, in FIG. 1 to FIG. 8(*b*), sizes are changed to easily intelligibly understand a structure, and the sizes of a cylinder bore or water and oil holes, and sizes of thickness, shape, and the like of a bead do not necessarily correspond to ratios of portions actually manufactured. Also, dotted lines in the drawings show mountain folds in a plan view, and dot-and-dash lines show valley folds.

FIG. 1 shows a structure of a gasket 20 according to an embodiment of the present invention. The gasket 20 is clamped between a cylinder head 12 and a cylinder block 13 fastened by bolts 11 which are fastening devices for an engine 10.

In the cylinder head 12, there is assembled an injector or an intake-exhaust valve which is not shown in the drawings, and insertion holes 14 pass through in an up-and-down direction. In the cylinder block 13, there are formed four cylinder bores 15 as sealing holes, and inside the cylinder bores 15, there are assembled pistons which are not shown in the drawings reciprocatingly in the up-and-down direction. Also, in the cylinder block 13, as the sealing holes, there are formed water and oil holes 16 such as water holes for water jacket, oil holes for lubricant oil, and the like formed on an outer periphery of the cylinder bore 15. Additionally, on the outer periphery of the cylinder bore 15, there are formed four bolt holes 17 relative to one cylinder bore 15. Incidentally, the engine 10 is not limited to a closed deck type, and may be an open deck type.

The gasket 20 is formed by sequentially laminating a plurality of metal plate 21, metal plate 22, and metal plate 23 from the top.

In the gasket 20, there are formed four opening portions 24 disposed corresponding to the cylinder bores 15; a plurality of water-oil-hole opening portions 25 disposed corresponding to the water-oil holes 16; and insertion holes 26 passing through in the up-and-down direction corresponding to the bolt holes 17. Also, in the gasket 20, there are respectively formed bead portions 27 disposed at peripheral edge portions of the bore opening portions 24; water-oil-hole bead portions 28 disposed at peripheral edge portions of the water-oil-hole opening portions 25; and insertion-hole bead portions 29 disposed at peripheral edge portions of the insertion holes 26. In the bore bead portion 27, the water-oil-hole bead portion 28, and the insertion-hole bead portion 29, there are formed seal beads, respectively.

Figure 2:
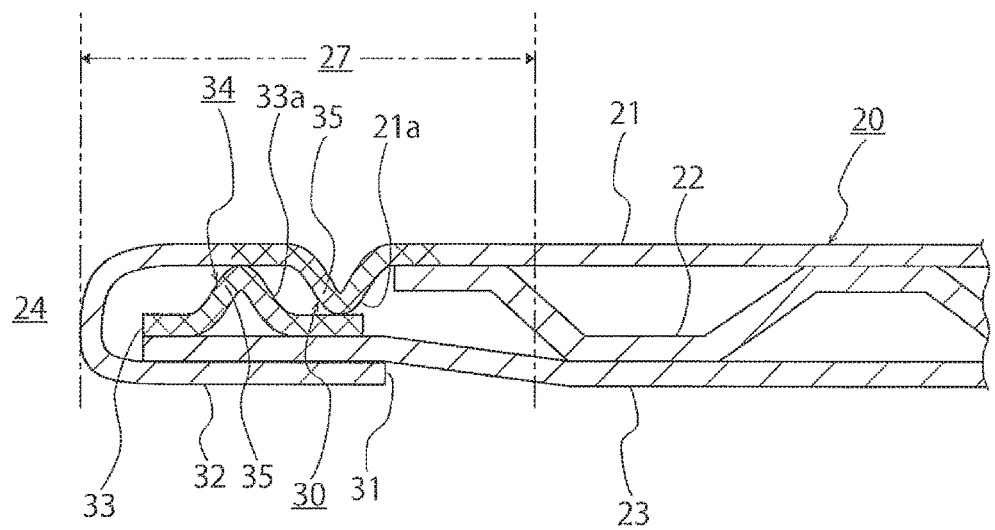
FIG. 2 is a cross-sectional view taken along a line II-II in FIG. 1.

As shown in FIG. 2, in the bore bead portion 27, there are formed a first bore bead 30 protruding downward from a flat surface of the metal plate 21 and annularly surrounding the bore opening portion 24 as a seal bead; and a folded portion 32 folding an end portion 31 on a bore opening portion 24 side of the metal plate 21 downward.

Also, inside the folded portion 32, there is disposed a ring-shaped member 33 annularly surrounding the bore opening portion 24. In the ring-shaped member 33, there is formed a second bore bead 34 protruding upward from a flat surface thereof and annularly surrounding the bore opening portion 24 as a seal bead. The ring-shaped member 33 is disposed on the bore opening portion 24 side more than the end portion 31 of the metal plate 21, and clamped between the metal plate 21 and the metal plate 23.

In such a gasket 20, the metal plate 21, the metal plate 23, and the ring-shaped member 33 are formed by a martensitic stainless steel plate, and there are formed high hardness portions 35 having a hardness higher than that of the metal plate 21 and that of the ring-shaped member 33 in at least one portion of the first bore bead 30 and in at least one portion of the second bore bead 34.

As for the martensitic stainless steel plate, for example, there can be shown as an example of SUS403, SUS410, SUS420J1, and the like specified in JIS. Also, the hardness of the stainless steel plate is set at a Vickers hardness value of 100HV or above and 234HV or less.

The martensitic stainless steel plate having the Vickers hardness value of 100HV or above and 234HV or less is used for the metal plate 21, the metal plate 23, and the ring-shaped member 33, more preferably, the martensitic stainless steel plate having a Vickers hardness value of 150HV or above and 190HV or less is used so as to reduce the hardness of the whole gasket 20 and become advantageous for solving an insufficient fastening force in a case wherein a fastening force of the bolts 11 is low.

Incidentally, the hardness of each of the metal plate 21, the metal plate 23, and the ring-shaped member 33 may have a different hardness, respectively. Also, the metal plate 22 can be formed by the martensitic stainless steel plate as well; however, it is preferable that the metal plate 22 has the hardness higher than that of the metal plate 21 and that of the metal plate 23, and has a characteristic as a spring material.

The high hardness portions 35 are formed at a portion where a surface pressure in a circumferential direction of the first bore bead 30 is low, and a portion where a surface pressure in a circumferential direction of the second bore bead 34 is low when the cylinder head 12 and the cylinder block 13 are fastened by the bolts 11.

Incidentally, it is sufficient that the high hardness portions 35 are formed at a face 21*a* on a side where the first bore bead 30 protrudes, and a face 33*a* on a side where the second bore bead 34 protrudes, wherein the surface pressure is applied the most in a case of being fastened by at least the bolts 11. However, as with the embodiment, if the high hardness portions 35 are formed in an entire portion of the first bore bead 30 (including the face 21*a* and a face on the opposite side) or an entire portion of the second bore bead 34 in a cross-sectional view, it becomes advantageous for improving a seal performance further.

The hardness of the high hardness portion 35 is preferably set at a Vickers hardness value of 200HV or above and 500HV or less, and in a case of being formed in the bore bead portion 27, it is more preferable that the hardness of the high hardness portion 35 is set at a Vickers hardness value of 250HV or above and 350HV or less. The hardness of the high hardness portion 35 is set at the hardness of the stainless steel plate or above, so that the hardness of a portion which becomes a low surface pressure of the bore bead portion 27 increases so as to become advantageous for improving the seal performance.

According to the aforementioned gasket 20, among the members forming the gasket 20, at least the metal plate 21, the metal plate 23, and the ring-shaped member 33 are formed by the martensitic stainless steel plate, so that even in a case wherein the hardness of the whole gasket 20 is reduced, and the fastening force by the bolts 11 is low, the insufficient fastening force can be prevented.

Also, the high hardness portion 35 having the hardness higher than that of the surroundings is formed at the portion which becomes the low surface pressure of the bore bead portion of the gasket 20, so that when the gasket 20 is clamped between the cylinder head 12 and the cylinder block 13, and fastened by the bolts 11, the portion which becomes the low surface pressure can be reinforced.

Figures 3A, 3B:
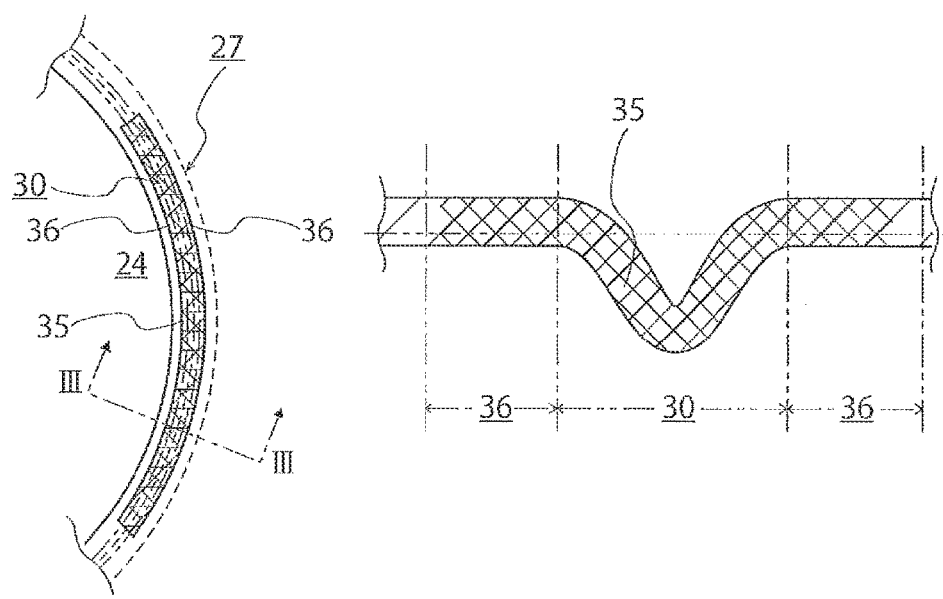

As shown in FIGS. 3(a) and 3(b), in the aforementioned gasket 20, it is preferable that the high hardness portion 35 extends to a portion 36 adjacent to the first bore bead 30 in a plan view. Thus, the high hardness portion 35 includes the portion 36 adjacent to the first bore bead 30 in the plan view so as to include a portion outside a bent portion of the first bore bead 30 as well. Accordingly, an occurrence of a crack at the bent portion thereof can be prevented. Incidentally, the same applies to the high hardness portion 35 formed at the second bore bead 34 as well.

Figure 4:
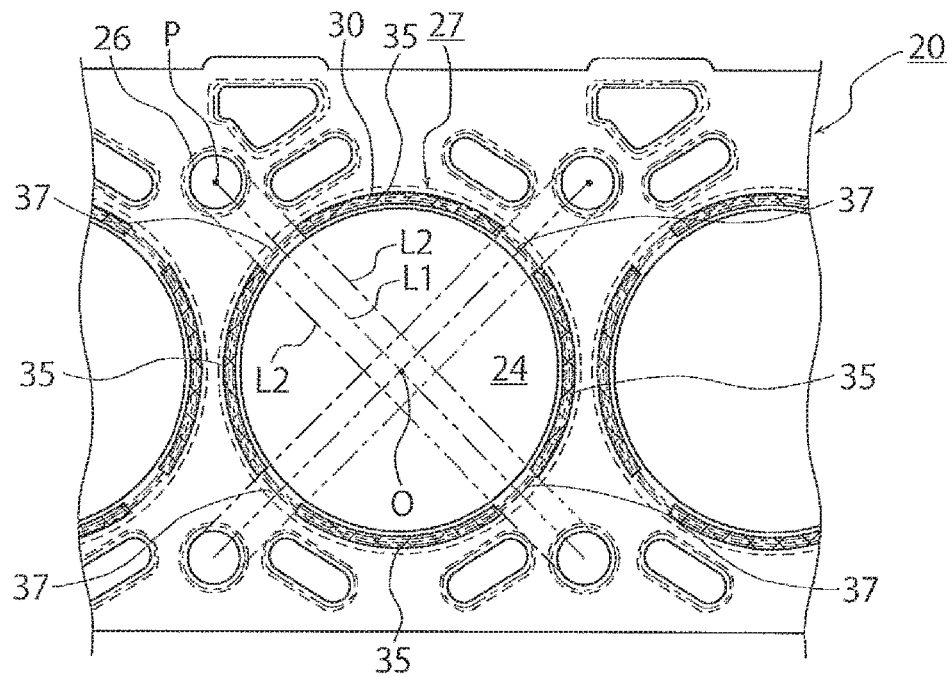
FIG. 4 is a plan view showing cylinder bores and bore bead portions in FIG. 1 as an example.

Also, as shown in FIG. 4, in the aforementioned gasket 20, it is preferable that the high hardness portions 35 and low hardness portions 37 having the hardness of the stainless steel plate are disposed alternately in the circumferential direction of the first bore bead 30 along the first bore bead 30, and that the low hardness portions 37 are disposed close to the insertion holes 26 more than the high hardness portions 35. Incidentally, the second bore bead 34 which is not shown in the drawing is structured in the same manner.

When the cylinder head 12 and the cylinder block 13 are fastened by the bolts 11, a fastening stress is concentrated near the insertion hole 26 of the gasket 20. In the bore bead portion 27, a fastening stress thereof is concentrated at a portion between tangents L2 of the insertion hole 26 which are parallel to a bolt axis line L1 connecting a center O of the bore opening portion 24 and a center P of the insertion hole 26. Therefore, in the first bore bead 30 and the second bore bead 34, there are alternately located a portion wherein a fastening stress is concentrated when fastened so as to become a high surface pressure and a high seal performance, and a portion which becomes a low surface pressure and a low seal performance, in the circumferential direction.

Therefore, the low hardness portion 37 is formed at the portion which becomes the high surface pressure and the high seal performance, and the high hardness portion 35 is formed at the portion which becomes the low surface pressure and the low seal performance so as to provide the rise and fall of rigidity in the circumferential direction of the bore bead portion 27. Thereby, the seal performance in the circumferential direction of the bore bead portion 27 is equalized so as to improve the seal performance.

Figure 5:
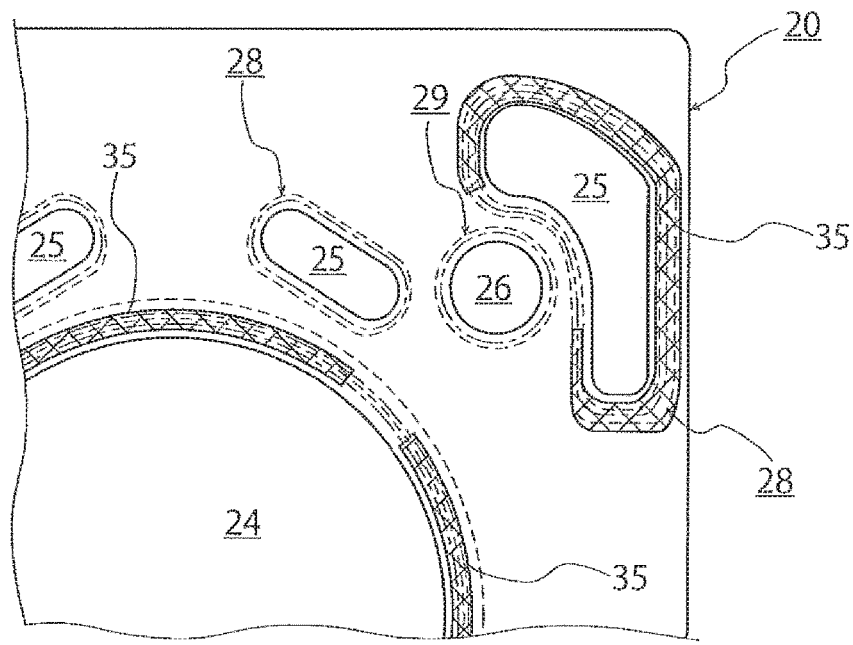
FIG. 5 is a plan view showing water-oil holes and water-oil-hole bead portions in FIG. 1 as an example.

Also, as shown in FIG. 5, in the aforementioned gasket 20, it is preferable that the high hardness portion 35 having the hardness higher than that of the stainless steel plate is formed in at least one portion of the water-oil-hole bead portion 28.

The high hardness portion 35 is formed at a portion where the fastening force of the bolt 11 of the water-oil-hole bead portion 28 is difficult to transfer. The portion where the fastening force of the bolt 11 of the water-oil-hole bead portion 28 is difficult to transfer is a portion disposed remotely from the insertion hole 26, or a portion having the bore opening portion 24 or the water-oil-hole opening portion 25 with respect to the insertion hole 26.

Also, it is preferable that the hardness of the high hardness portion 35 formed in the water-oil-hole bead portion 28 has a Vickers hardness value of 300HV or above and 450HV or less. Especially, in the water-oil-hole bead portion 28 positioned outside the insertion hole 26 in the plain view, the fastening force of the bolt 11 is difficult to transfer, so that it is preferable that the hardness thereof is set to be harder than that of the high hardness portion 35 formed in the bore bead portion 27.

Thus, the high hardness portion 35 is formed in the water-oil-hole bead portion 28 where the fastening force of the bolt 11 is difficult to transfer so as to improve the rigidity of the water-oil-hole bead portion 28, wherein an overhang increases, or an opening increases at an operation time of the engine 10 so that the seal performance cannot be obtained, and obtain the seal performance.

Next, the method for manufacturing the gasket 20 will be explained. First, the metal plate 21 to the metal plate 23, and the ring-shaped member 33 are formed. Next, the bore opening portion 24, the water-oil-hole opening portion 25, and the insertion hole 26 are formed in the metal plate 21 to the metal plate 23. Next, the bore bead portion 27, the water-oil-hole bead portion 28, and the insertion-hole bead portion 29 are formed in the metal plate 21, and the second bore bead 34 is formed in the ring-shaped member 33.

Next, laser is irradiated from a protruding face 21a side of the first bore bead 30 of the metal plate 21 toward the first bore bead 30, and from a protruding face 33a side of the second bore bead 34 of the ring-shaped member 33 toward the second bore bead 34, and irradiation portions are cooled by a cooling device which is not shown in the drawings. The high hardness portion 35 is formed by hardening processing by the laser. Also, the seal bead of the water-oil-hole bead portion 28 is irradiated with a laser as well in the same manner, and cooled to form the high hardness portion 35. Incidentally, the hardness of the high hardness portion 35 can be adjusted by changing any of a laser irradiation time, a hardening depth from the face 21a on a protruding side, and a cooling time by the cooling device.

Next, the folded portion 32 is folded so as to dispose the ring-shaped member 33 inside the folded portion 32, and the metal plate 21 to the metal plate 23, and the ring-shaped member are laminated so as to complete the manufacturing of the gasket 20.

According to the method for manufacturing the gasket, the high hardness portion 35 can be easily formed in a short time only at a necessary portion by the laser hardening processing. Also, the laser irradiation time or the hardening depth is changed so as to become advantageous for a case of changing the hardness of the high hardness portion 35.

Figure 6:
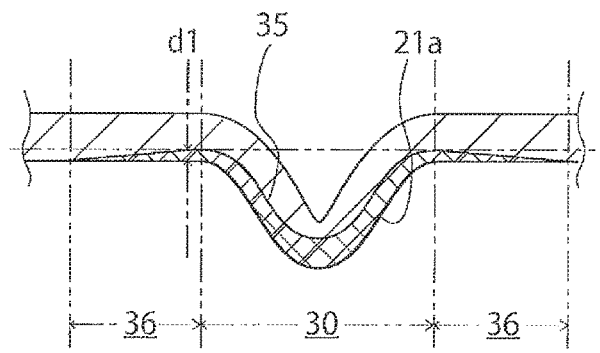
FIG. 6 is a horizontal cross-sectional view showing another example of the high hardness portion in FIG. 1.

As shown in FIG. 6, in the high hardness portion 35, at least one of the laser irradiation time, the hardening depth from the face 21a on the protruding side, and the cooling time by the cooling device is changed, so that the hardness thereof is gradually reduced toward a boundary between the high hardness portion 35 and portions other than the high hardness portion 35. Here, a hardening depth dl gradually becomes shallow toward a width direction of the first bore bead 30, and the hardness of the high hardness portion 35 is smoothly reduced toward the width direction of the first bore bead 30. Thereby, an occurrence of a crack at a boundary portion of the high hardness portion 35 can be prevented so as to prevent a breakage. Incidentally, it is preferable that even in a vertical cross section of the first bore bead 30, the hardness is gradually reduced toward the boundary between the high hardness portion 35 and the portions other than the high hardness portion 35 in the same manner.

According to the gasket 20 shown in FIG. 1 to FIG. 6, thicknesses of the cylinder head 12 and the cylinder block 13 are reduced, so that even if the fastening force by the bolt 11 is reduced, the insufficient fastening force can be prevented, and a sufficient sealing characteristic can be obtained so as to become advantageous for the weight reduction and low rigidity of the engine 10. Thereby, fuel consumption of the engine 10 can be improved.

Incidentally, in the aforementioned embodiments, the gasket 20 clamped between the cylinder head 12 and the cylinder block 13 has been shown as an example; however, the present invention is not limited to the above.

Figure 7:
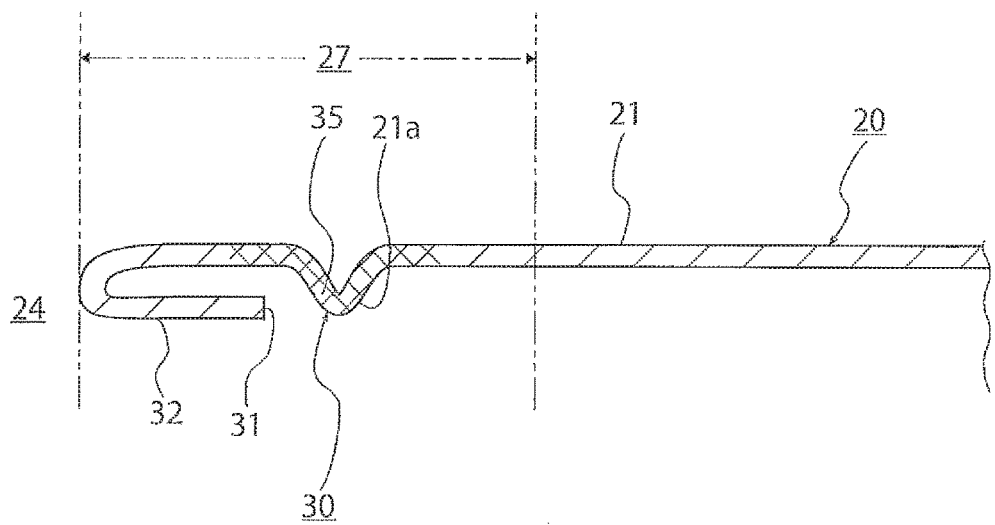
FIG. 7 is a cross-sectional view showing another embodiment of the gasket as an example according to the present invention.

For example, as shown in FIG. 7, without laminating the plurality of metal plate 21 to metal plate 23, and ring-shaped member 33, the gasket 20 may be formed only by one sheet of metal plate 21.

Figure 8A:
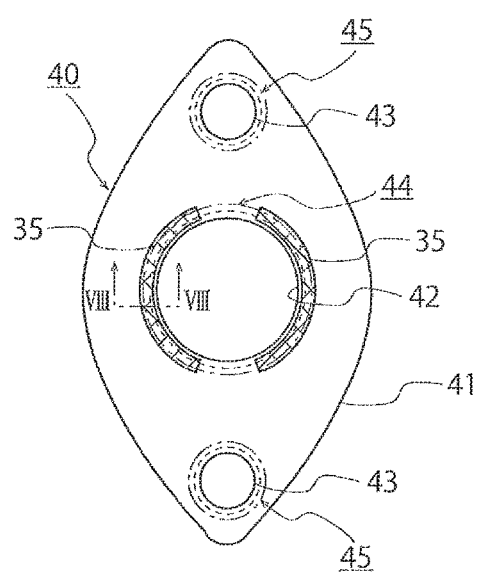

Also, as shown in FIG. 8(a), the present invention can be applied to an intake-and-exhaust-system manifold gasket 40 as well. The manifold gasket 40 is formed by one metal plate 41 of a martensitic stainless steel plate. In the metal plate 41, there are formed a manifold opening portion 42 disposed corresponding to a manifold, and insertion holes 43 corresponding to fastening bolt holes. Also, there are respectively formed manifold bead portions 44 disposed at peripheral edge portions of the manifold opening portions 42, and insertion-hole bead portions 45 disposed at peripheral edge portions of the insertion holes 43.

Figure 8B:
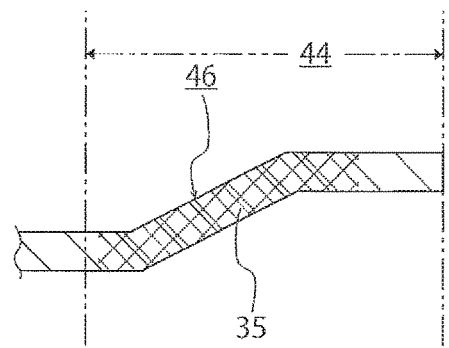

As shown in FIG. 8(b), in the manifold bead portion 44, as the seal bead, there is formed a manifold bead 46 protruding upward from a flat surface of the metal plate 41, and annularly surrounding the manifold opening portion 42.

In such a manifold gasket 40, the high hardness portion 35 having the hardness higher than that of the metal plate 41 is formed in at least one portion of the manifold bead 46.

According to the manifold gasket 40, as with the previously described gasket 20, even if the fastening force is reduced, the insufficient fastening force can be prevented, and the sufficient sealing characteristic can be obtained.

Also, in the aforementioned embodiments, an example wherein the high hardness portion 35 is formed in the water-oil-hole bead portion 28 formed at a corner of the gasket 20 has been explained; however, the present invention is not limited to the above. For example, the water-oil-hole bead portion 28 may be formed around the bore opening portion 24.

Also, the high hardness portion 35 can be formed over the entire periphery of the bore bead portion 27 or the water-oil-hole bead portion 28 as well.

The disclosure of Japanese Patent Application No. 2014-230619, filed on Nov. 13, 2014, is incorporated in the application.

While the invention has been explained with reference to the specific embodiments of the invention, the explanation is illustrative and the invention is limited only by the appended claims.

What is claimed is:

1. A gasket comprising:
   at least one metal plate formed of a martensitic stainless steel plate and adapted to be clamped between two members fastened by fastening devices,
   a cylinder bore provided in the at least one metal member,
   a seal bead protruding outwardly from a flat surface of the at least one metal plate, and annularly surrounding the cylinder bore, the seal bead having a top portion and two side portions arranged at two sides of the top portion, and
   insertion holes for the fastening devices to pass through, provided around the cylinder bore,
   wherein the seal bead has a high hardness portion having a hardness higher than that in a portion of the at least one metal plate other than the high hardness portion, the high hardness portion having a thickness gradually reduced toward a boundary between the high hardness portion and the portion other than the high hardness portion.

2. A gasket according to claim 1, wherein the high hardness portion has a hardening depth gradually becoming shallow toward a width direction of the seal bead, and the hardness of the high hardness portion is smoothly reduced toward the width direction thereof.

3. A gasket according to claim 2, wherein the high hardness portion extends from the top portion to the at least one metal plate adjacent thereto through the two side portions.

4. A gasket according to claim 3, wherein the high hardness portion is formed by a laser hardening processing on the seal bead from a protruding direction of the seal bead.

5. A gasket according to claim 1, wherein the high hardness portion and a low hardness portion are formed alternately in a circumferential direction of the seal bead, and the low hardness portion is disposed close to the insertion hole more than the high hardness portion.

* * * * *